Dec. 8, 1942.  H. E. HOGAN  2,304,407
INTERNAL COMBUSTION ENGINE
Filed Feb. 16, 1942  5 Sheets-Sheet 1
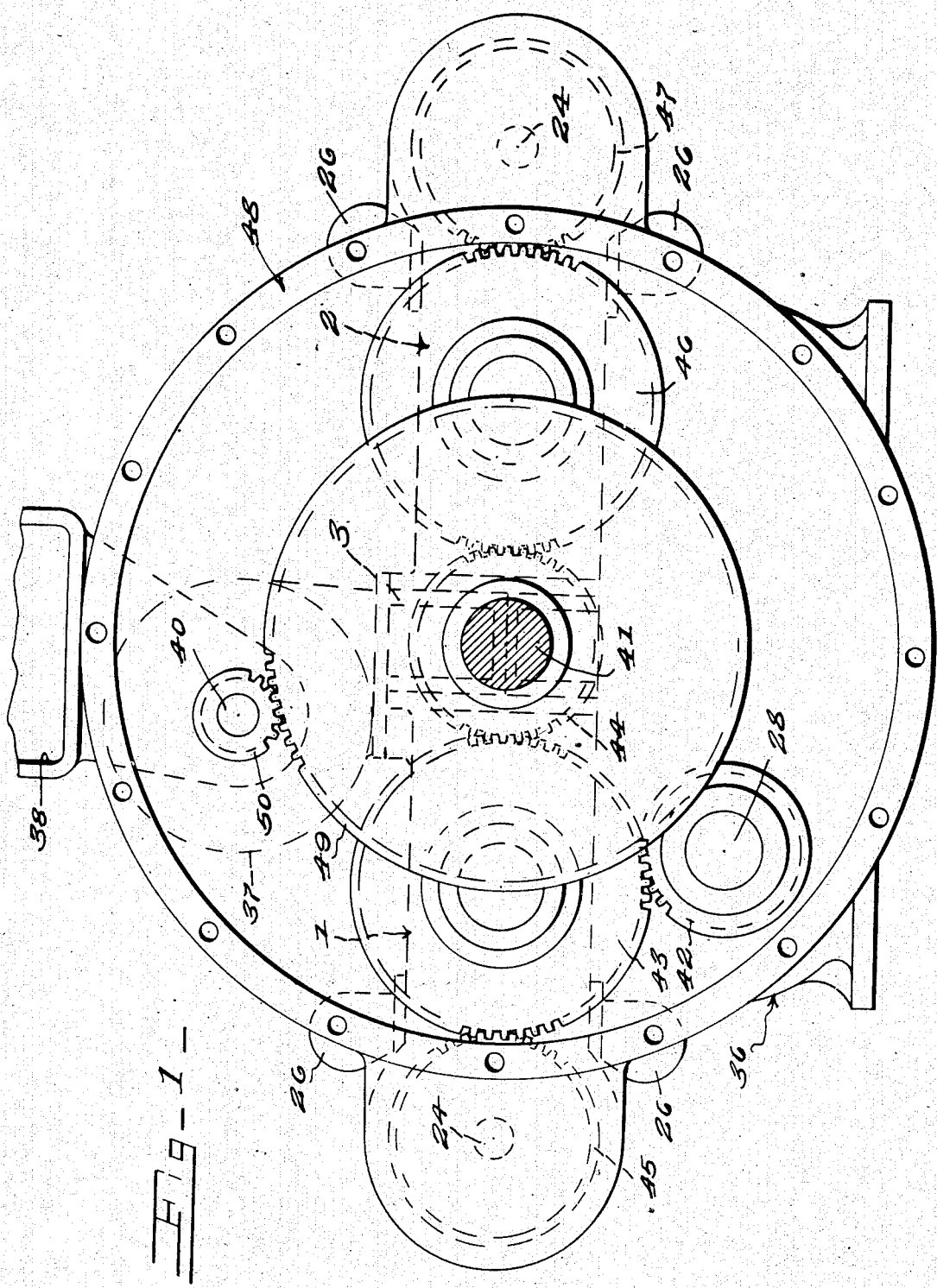
Fig-1-
INVENTOR.
Hugh E. Hogan.
BY
Bodell & Thompson.
ATTORNEYS.

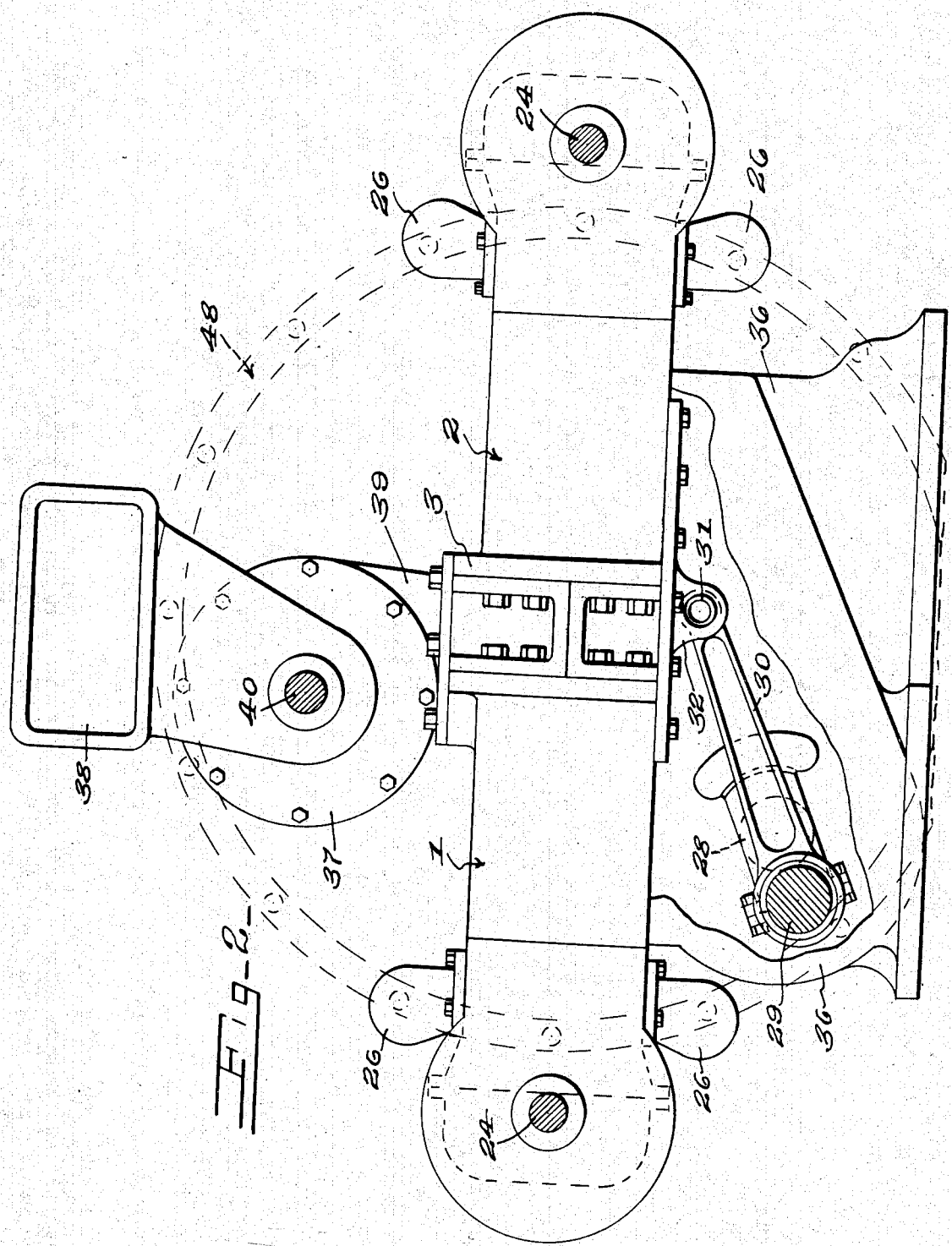

Dec. 8, 1942.    H. E. HOGAN    2,304,407
INTERNAL COMBUSTION ENGINE
Filed Feb. 16, 1942    5 Sheets-Sheet 3
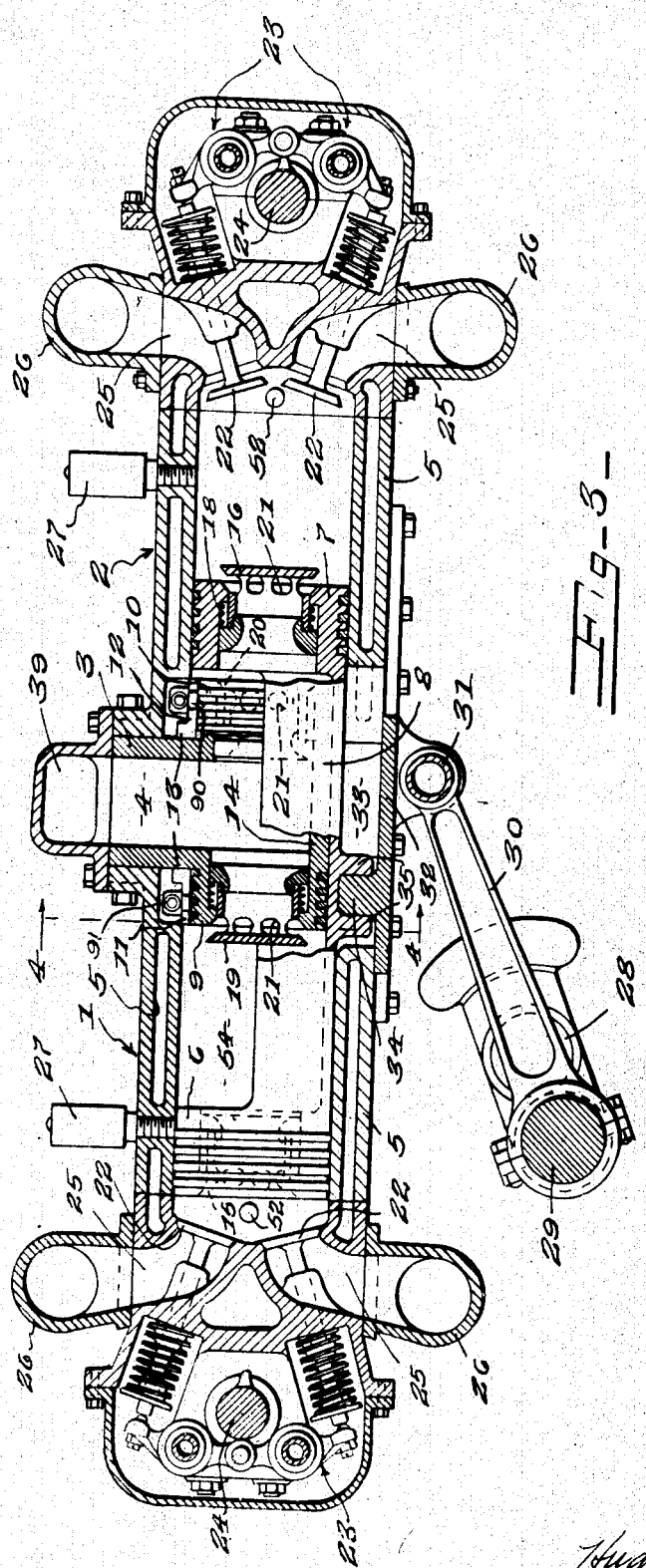
INVENTOR.
Hugh E. Hogan
BY Bodell & Thompson
ATTORNEYS.

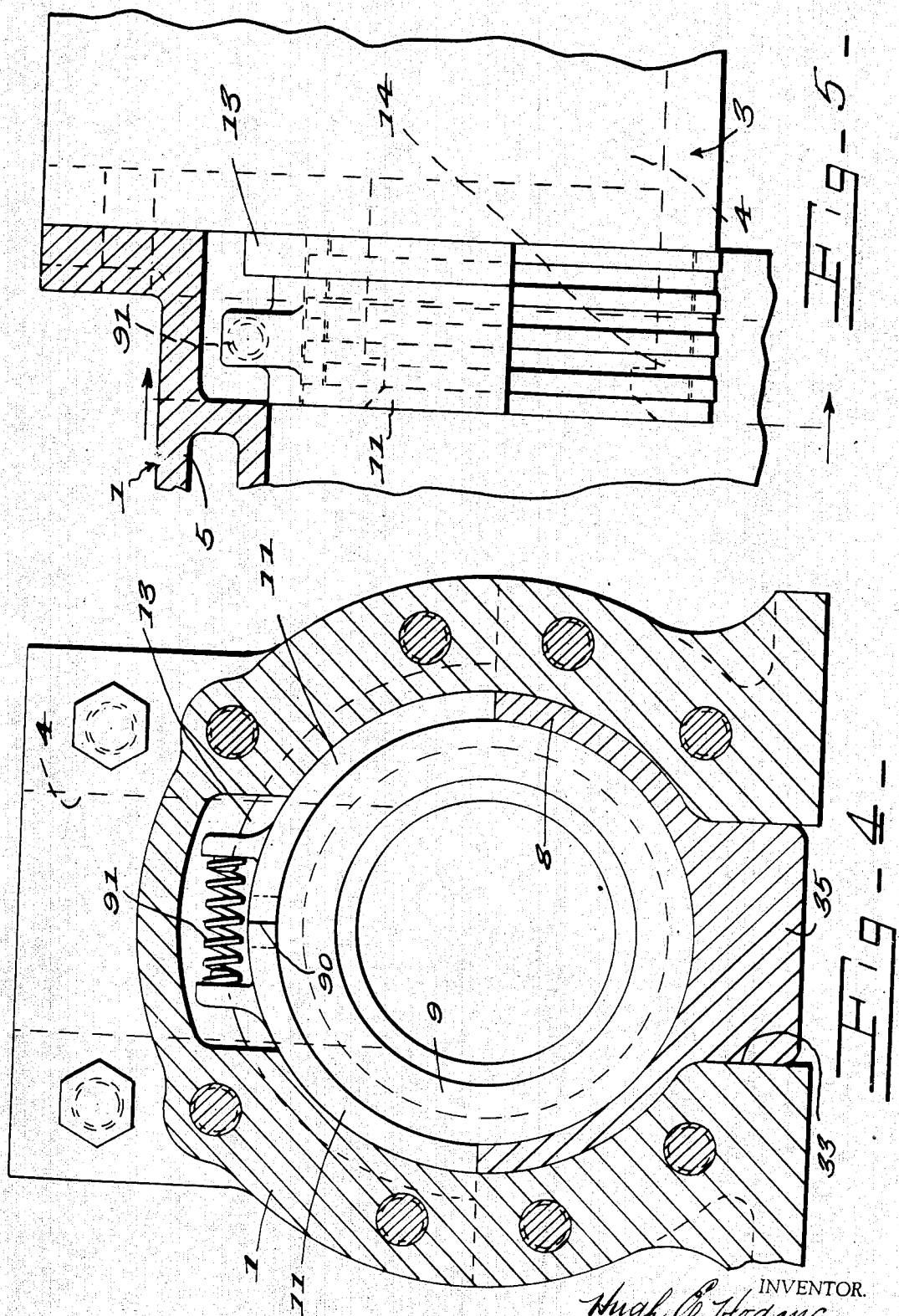

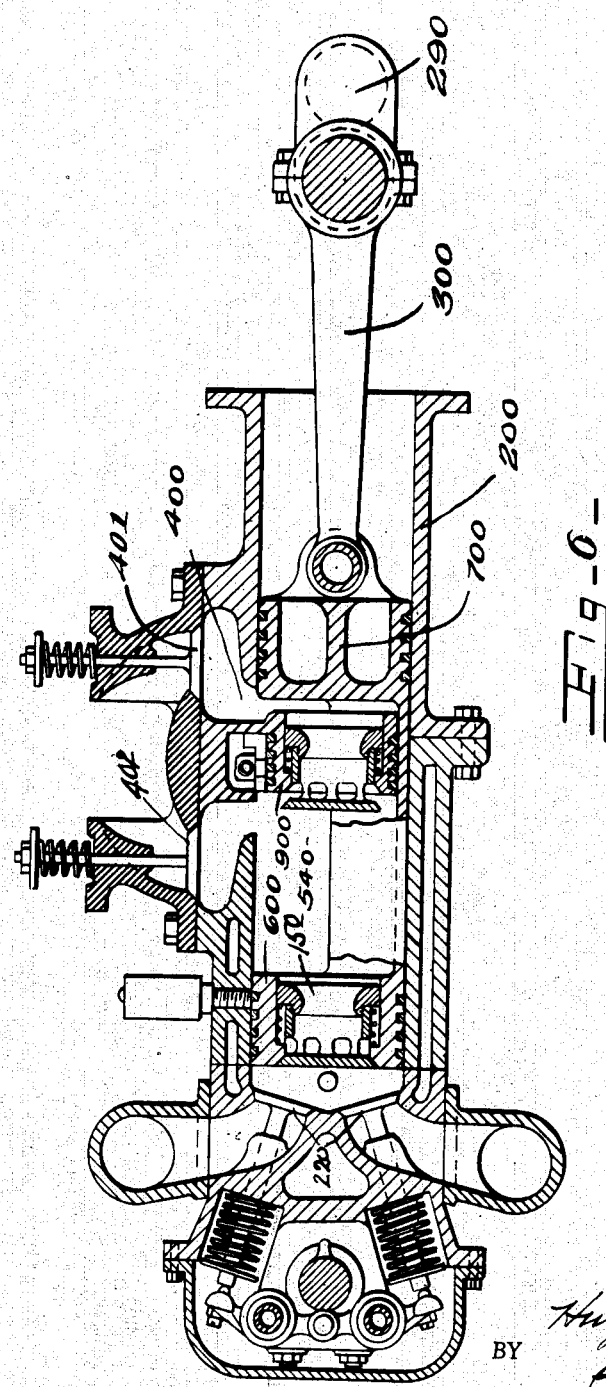

Patented Dec. 8, 1942

2,304,407

UNITED STATES PATENT OFFICE 2,304,407

INTERNAL COMBUSTION ENGINE

Hugh E. Hogan, Owego, N. Y.

Application February 16, 1942, Serial No. 431,080

9 Claims. (Cl. 123—61)

This invention has for its general object a multi-charged two or four cycle horizontally opposed, internal combustion engine, which is particularly compact or flat in arrangement of its parts and which is also internally air cooled.

It further has for its object a four cycle internal combustion engine in which the fuel is injected into the air in the cylinder during the compression stroke, and the air forced into the cylinders during the suction stroke through an intake valve in the outer cylinder head and also through a valve in the piston head from a transfer chamber, or means for multi-charging the combustion chamber with air on the intake stroke of the piston to completely fill the combustion chamber, and also into the cylinders during the scavenging stroke to force the exhaust gases from the cylinders and also cool the cylinders internally.

It further has for its object a two cycle engine in which the air used is compressed by the piston in a transfer chamber in the cylinder in the rear of the piston during the power stroke of the piston, which air is used during the scavenging stroke, when the pressure of the combusted charge is released by the opening of the exhaust valve and which air used during the scavenging stroke is mixed with fuel on the compression stroke, with means for supplying air under pressure to the combustion chamber for scavenging and for mixing with fuel on the compression stroke for combustion on the power stroke, or a two cycle engine which the fresh air used for combustion enters the combustion chamber under pressure.

It further has for its object mechanism for carrying out the method of operating a four cycle internal combustion engine comprising blowing air under pressure into the combustion chamber during the suction stroke, and also during the scavenging stroke, and injecting a motive fluid into the air in the cylinder during the compression stroke, the air being preferably passed into the combustion chamber during the suction and savenging strokes through the piston head, or of operating a two cycle engine with exhaust valves in the outer cylinder head and means for blowing air under pressure into the combustion chamber from a transfer chamber, preferably through a valve in the piston and injecting fuel into the combustion chamber during the scavenging and compression stroke.

It further has for its object a multi-charged or two cycle engine (Figure 6) with two intake and compression chambers, with means for supplying a multi-charge of air under pressure for scavenging and combustion or for supplying a triple charge of air for a four cycle engine on the suction stroke and a multi-charge of air on the scavenging stroke.

The invention consists in the novel features and in the combinations and constructions hereinafter set forth and claimed.

In describing this invention, reference is had to the accompanying drawings in which like characters designate corresponding parts in all the views.

Figure 1 is a side elevation of this engine looking in a direction axially of the crankshaft.

Figure 2 is a view similar to Figure 1, parts being removed.

Figure 3 is a longitudinal sectional view through the cylinders.

Figure 4 is an enlarged end view of one side of the central body showing the adjacent cylinder head and the insert therein, in which the head is partly mounted, this being taken approximately on line 4—4, Figure 3, with the valve in the adjacent cylinder head removed.

Figure 5 is a fragmentary elevation of parts seen in Figure 4.

Figure 6 is a view similar to Figure 3 of a slightly modified form.

The invention is here illustrated as embodied in an engine having two banks of cylinders as a horizontally opposed motor, although in regard to certain features, it may be embodied in a motor having one cylinder or a bank of cylinders.

1 and 2 designate a pair of horizontally opposed cylinders mounted on opposite sides of a central block or body 3, which is formed with an air pressure chamber 4. The cylinders are here shown as formed with jackets 5 for receiving an external liquid cooling medium, as water.

6 and 7 are piston heads working in the cylinders 1 and 2, these being connected together by a part cylindrical skirt portion 8 extending through the body 3, this skirt sliding on the cylinder walls. The skirt 8 is substantially semi-circular in cross-section and slidably fits the cylinder walls. 9 and 10 are stationary heads at the inner ends of the cylinders 1 and 2, these slidably fitting the inner face of the skirt portion 8 and the inner face of an arcuate or semi-circular insert 11 or 12 in the inner end of the cylinder 1 or 2, the inner face of the insert being concentric with the axis of the cylinder and of the same radius as the inner face of the skirt 8. The insert 11 or 12 is suitably interlocked against endwise movement, it being shown as formed with peripheral, semiannular, arcuate flange 13 interposed between the base of the cylinder and the adjacent side of the body 3. The cylinder heads 9, 10 are also connected by an arcuate skirt portion 14 which slidably fits within the skirt portion 8 of the piston heads 6, 7. The piston heads 6, 7, as well as the cylinder heads 9, 10, are provided with suitable piston rings or compression locks. In this description, the ends of the cylinders adjacent the body 3 are considered the inner and those remote from the body 3 as the outer ends. This explanation is made because in considering the strokes of an internal combustion engine, the "in" stroke of the piston is that away from the crank shaft as the compression stroke and "out" stroke that toward the crank shaft as the power stroke.

Each insert 11 or 12 is formed in two sections, each being substantially quarter circular, the sections lapping each other at 90 and these sections are pressed outwardly in order to snugly fit the cylinder walls by spring 91, and hence seal the joint between the edges of the semicircular skirt 8 and the cylinder wall.

Passages are provided connecting portions of the cylinder 1 or 2 on opposite sides of the piston heads 6 or 7 and also passages are provided opening into the inner ends of the cylinders on the rear side of the pistons. The portions of the cylinders on the rear side of the pistons constitute air transfer chambers. Normally-closed, spring-loaded valves are provided in these passages, the valve in the passage leading from the transfer chamber to the combustion chamber being opened at the end of the intake stroke of the piston in the combustion chamber by the higher pressure of the air in the transfer chamber on the valve. The valve in the piston is also opened during the scavenging stroke by the pressure of the air in the transfer chamber, while the pressure in the combustion chamber is being released by reason of the fact that the exhaust valves are open. The valves controlling the intake passages for the transfer chambers are also spring-loaded and normally-closed, and are held closed by the compression in the transfer chamber during the power strokes and are opened during the scavenging strokes by vacuum in the transfer chamber and air pressure in the body 3. In the illustrated embodiment of the invention, these passages and the valves are located respectively in the piston heads 6, 7 and cylinder heads 9, 10.

Each of the piston heads 6, 7 is provided with a valve passage therethrough in which is located a normally-closed, spring-pressed or loaded valve 15 or 16 pressed toward closed position by a spring, as 18, these valves opening toward the outer ends of the cylinders, or outwardly from the pressure faces of the pistons. Each of the heads 9, 10 is provided with a similar valve 19 or 20 which also is normally closed and spring loaded, and opens toward the outer ends of the cylinders or toward the piston heads 6, 7 of the cylinders respectively. Each of the valves 15, 16, 19 or 20 is tubular with radially extending passages, as 21, under the heads of the valves. The cylinders are provided with valves, preferably located in the outer cylinder heads and mechanism for operating the valves. These valves may both be exhaust valves, or in some constructions, one may be an exhaust valve and the other an intake valve. The valves are alike in construction, and preferably are exhaust valves. They are operated against the action of returning springs by rocker arm mechanism coacting with a cam shaft, which is actuated from the crank shaft of the engine in any suitable manner. 22 designates the valves; 23 the rocker arm mechanism coacting with the cam shaft 24. 25 are ports controlled by the valves 22, these communicating with suitable manifolds 26.

27 designates a fuel injector for each cylinder, this operating to inject fuel into the compression chamber of the cylinder during the compression stroke. It is actuated and timed in any well known manner from the crank shaft, and in so far as this invention is concerned, it is merely a fuel injector. Therefore, further description thereof is thought to be unnecessary.

28 designates the crank shaft, the crank pin 29 of which is connected to the skirt portion 8 of the piston by means including a connecting rod 30 and a cross-head or slide, the rod being pivoted at its outer end at 31 to the slide or cross-head 32. The slide or cross-head 32 is connected to the skirt portion 8 through a slot 33 in the portion of the cylinder walls and in the body 3 covered by the skirt portion 8. As here shown, the cross-head is formed with a shoulder or lug 34 interfitting in a groove or between two spaced lugs 35 on the outer side of the skirt portion 8, these lugs 34, 35 working in the slot 33. The crank shaft 28 is located at one side of the cylinders and extends in a direction crosswise of the axis of the cylinders. It is mounted in a suitable base 36 on which the body 3 and the cylinders are also mounted.

Air under pressure is supplied to the air chamber 4 in the body 3 by suitable means, here shown as a blower 37, the casing of which is mounted on the body 3 and which has an air intake 38. The outlet 39 of the blower discharges into the chamber 4 of the body 3. There is one blower for each pair of cylinders 1, 2. In an engine consisting of a plurality of pairs, each pair of cylinders is preferably equipped with a blower. The rotor of the blower or blowers are mounted upon a shaft 40 actuated from the crank shaft 28.

41 designates the output or propeller shaft mounted on the base 36. The motion of the crank shaft 28 is transmitted to the propeller shaft through a gear 42 on the crank shaft, intermediary gear 43 meshing therewith, and with a gear 44 on the propeller shaft. The cam shafts 24 are actuated from the crank shaft, one through the gear 43 meshing with the gear 45 on one of the cam shafts, and the other cam shaft through gear 46 meshing with the gear 44 on the output or propeller shaft, and a gear 47 on said other cam shaft. The cam shafts 24 and the gears 43 and 46 are mounted on a suitable support or housing 48 carried by the base 36. The blower shaft 40 is actuated from the crank shaft 28 through a gear 49 on the output or propeller shaft 41 and meshing with a pinion 50 on the blower shaft 50. The crank shaft 28 and the output or propeller shaft 41 are suitably mounted in the base 36 and housing 48.

52 designates spark plugs connected in suitable ignition system.

In Figure 6, an engine is shown in which the piston, instead of being connected to the crank shaft through a crosshead, is connected by a connecting rod 300 to the crank of the crank shaft 290 in the usual manner, the piston heads 600 and 700 corresponding to the piston heads 6, 7 being connected together substantially as shown in Figure 3, but the piston head 700 merely acts as a compressor and is not a power piston. This form of engine as shown is of the conventional type or not a horizontally opposed engine. The piston head 600 is provided with the valve-controlled passage therethrough, as in Figure 3. The air chamber 400 has an intake controlled by valve 401. This chamber 400 also communicates through a valve-controlled passage in the cylinder head 900, with the transfer chamber 540, as in Figure 3, in the rear of the piston head 600, and the piston 700 on its inward stroke toward the body compresses the air. The compressed air passes through the valve-controlled passage of the cylinder head 900 into the chamber 540 in the rear of the piston 600 during the outward stroke of the piston 600. The air chamber 400 communicates with the cylinder 200 in which the piston 700 works in the rear of the piston 700, so that the piston 700 acts as an air compressor piston during its inward stroke and does not act as a power piston. The transfer chamber 540 to which the blower is connected has an intake valve 402 through which air enters the transfer chamber 540, as the piston 600 is on the outer stroke. At the end of the outer stroke, valve 402 closes and the air is compressed in chamber 400 and is forced through valve passages in cylinder head 900 into transfer chamber 540. As the piston travels in on the inner stroke, the air in transfer chamber 540 is compressed and forces the valve in piston 600 open and the air under compression is forced into the combustion chamber through the valve passage in piston 600, forcing burned gases out the mechanically operated exhaust valves in the outer cylinder heads. The valve passage in piston 600 is closed by valve 150 in piston head 600 when the pressure in the combustion chamber is greater than the pressure in the transfer chamber 540. As the piston 600 travels on its outer stroke the compressed air from transfer chamber 540 expands due to the lower pressure in the combustion chamber forcing the exhaust gases out the exhaust valve passages. The exhaust valves 220 of the cylinder are closed as soon as the exhaust gases are forced out of the combustion chamber. The fresh air forcing the exhaust gases out of the combustion chamber is retained, compressed and mixed with fuel from the injector 27 for combustion on the power stroke.

The flow of air into the air chamber 400 is controlled by the valve 401 which may be suction operated or timed and operated in any conventional manner. Briefly, first air is received in the chamber 400 and in the space between the piston head 700 and the cylinder head 900, this air being compressed and forced past the valve in the piston head 900 into the transfer chamber 540 which is full of uncompressed air blown into the valve passage 402 in the transfer chamber 540, as the piston 600 is on the scavenging and compression stroke. Thus, the transfer chamber 540 receives a multi-charge during the scavenging and compression stroke of the piston 600 and this double charge is forced through the valve passage in the piston 600 into the combustion chamber to force the burned gases out of the cylinder, at the end of the power stroke of the piston 600 and admitting the charge to be compressed and fired on the out stroke of the piston 600 which charge fills the cylinder in which the piston 600 works.

In any form of the invention, this completely filling of the power cylinder with air to support combustion maintains a substantially uniform compression, regardless of the throttle position of the engine, as the cylinder is always full of something, and there is no excess vacuum in the cylinder, even when the throttle is open only partly.

Also, the engine shown in Figure 3 may be operated as a four cycle engine by timing and operating one of the valves 22 as an air intake valve suitably modifying the cam shaft 24 and utilizing one of the manifolds 26, as an air intake manifold. In this operation as a four cycle engine, the valve 22 acting as an intake valve will be opened while the piston is on its suction stroke. At the inner stroke of the piston 6, the air in the transfer chamber 54 behind the piston 6 will pass through the passage controlled by the valve 15 in the combustion chamber in the head 6. Assuming that the piston 6 is on its suction stroke, the valve 22 acting as an air intake valve will be open. As the piston travels in on the suction stroke, air is drawn or blown into the combustion chamber until the piston is near the end of the suction stroke, the intake valve 22 closes at the end of the suction stroke or inner stroke of the piston 6. The valve 15 in the piston head 6 will be opened by the lower pressure in the combustion chamber of the cylinder 1 and the air compressed in the rear of the piston 6 in the transfer chamber 54, will pass through the open valve 15 into the combustion chamber of the cylinder 1. This operation forces a multi-charge of air into the combustion chamber. When the piston 6 is on its compression stroke, the valve 22 acting as an intake valve will be closed by its timing and operating mechanism, and the valve 15 will be closed by the compression and spring-loaded valve. The valve 19 will be opened by the air pressure within the chamber 4 of the body 3 and the vacuum created in the chamber 54, so that air flows into the transfer chamber 54 behind the piston 6. During the compression stroke, the fuel is injected, as before, by the fuel injector into the air in the combustion chamber. During the power stroke, the air is compressed in the transfer chamber 54. At the end of the power stroke, the other valve 22 acting as an exhaust valve is opened and the pressure of the air in the transfer chamber 54 forces open the valve 15, permitting air to pass into the combustion chamber during the scavenging stroke. While these actions are taking place, similar actions are taking place in the cylinder 2 in the same order but at different periods of timing.

In operating this engine, as a two cycle engine, both valves 22 are operated and timed as exhaust valves. During the power stroke, obviously both valves 15 and 19 will be closed and the air previously taken in behind the piston 6 will be compressed in the transfer chamber 54. At the end of the power stroke, the exhaust valves 22 will be opened and the air from the transfer chamber 54 passed into the combustion chamber of the cylinder through the open valve 15, facilitating the scavenging and supplying the air to support combustion of the fuel, which is injected from the fuel injector 27 during the scavenging and compression stroke. While the air is thus passing into the combustion chamber through the open valve 15, the pressure in the chamber 4 and the vacuum in chamber 54 opens the valve 19 permitting the transfer chamber to be filled with air. During the power stroke, the air in the chamber 54 is compressed to be discharged into the combustion chamber during the scavenging and compression stroke. The piston 7 in the cylinder 2 is going through a similar cycle, but while the piston 6 is on its scavenging and compression stroke, the piston 7 is on its power stroke.

In the engine shown in Figure 6, the operation is the same as in a four cycle or two cycle engine before described, except that the piston 700 acts as an additional intake and transfer chamber to compress a charge of air through the valve-controlled passage 19 into the compression chamber 540 of the cylinder 1, multiplying the charge of air in the transfer chamber 540 to be compressed and forced into the combustion chamber through valve passage in the piston.

This invention, owing to its construction, is particularly compact and particularly flat, and hence may be located in a compact space, as in the wing of an airplane. Also, owing to its construction, a multi-charge of air is forced into the compression and combustion chamber in a particularly simple manner to supply air to support combustion during the power stroke of the fuel injected into the air during the compression stroke, and to cool and scavenge the cylinders during the scavenging stroke, resulting in an engine with less weight, less parts, less space required and with less weight per horsepower than in conventional engines, due to the larger volume of high compressed gases in the combustion chamber. Such an engine would be especially adaptable to high altitude flying. In the multi-charged two cycle engine, due to the volume of air that enters the combustion chamber, this engine should be adaptable for Diesel engine operation.

What I claim is:

1. In an internal combustion engine, opposing cylinders arranged in axial alinement, pistons including heads working in the cylinders respectively, and a part-cylindrical skirt portion connecting the heads, opposite outer ends of each cylinder constituting firing chambers, a reciprocating cross-head slidable on the outer sides of the cylinders and extending across the body and connected to the skirt portion, a crank shaft, a connecting rod between the cross-head and the crank shaft, and intake and exhaust valves operable to control the flow of air and fuel to and from the combustion chambers of the cylinders.

2. In an internal combustion engine, a body, cylinders arranged in axial alinement on opposite sides of the body, pistons including heads working in the cylinders respectively, and a part-cylindrical skirt portion connecting the heads, the body having a guide opening through which the skirt portion works, opposite outer ends of the cylinders constituting firing chambers, stationary heads at the inner ends of the cylinders adjacent the body and coacting with the skirt portion to hold compression, a reciprocating cross-head slidable on the outer sides of the cylinders and extending across the body and connected to the skirt portion, a crank shaft, a connecting rod between the cross-head and the crank shaft, intake and exhaust valves operable to control the flow of air and fuel to the exhaust from the combustion chambers of the cylinders, the intake valves including normally-closed, spring-loaded valves in the piston heads openable by air pressure in the cylinders in the rear of the pistons during the suction stroke, and means for supplying and controlling the flow of air under pressure to the cylinders in the rear of the piston heads.

3. In a four-cycle, internal combustion engine, a body, cylinders arranged in axial alinement on opposite sides of the body, pistons including heads working in the cylinders respectively, and a part-cylindrical skirt portion connecting the heads, the body being formed with an air chamber, heads at the inner ends of the cylinders adjacent the body and coacting with the cylinder walls and the adjacent portion of the connecting skirt portion, thereby forming an air transfer chamber behind the piston heads at the inner ends of the cylinders, the piston and cylinder heads having valve passages therethrough, the latter opening in the body, normally-closed, spring-loaded valves in the pasages of the piston heads and said cylinder heads, means for supplying air under pressure to the chamber of the body, the valves in the cylinder heads being arranged to open under the lower pressure in the combustion chambers during the intake strokes of the pistons and under the higher pressure in the transfer chamber and the valves in said cylinder heads arranged to open the transfer chamber and toward the piston heads during the compression strokes of the pistons and to close during the power and intake strokes, a fuel injector for each cylinder, a crank shaft, a connecting rod, and means for connecting the rod to the skirt portion to translate the reciprocating movement of the pistons to the crank shaft.

4. In an internal combustion engine, a body formed with a chamber, a cylinder mounted on the body, a piston including a head working in the cylinder, and a part-cylindrical skirt portion extending through the body, a crank shaft located laterally at one side of the cylinder and extending in a direction crosswise of the axis of the cylinder, a connecting rod, means connecting the connecting rod to the skirt portion of the piston, a head at the inner end of the cylinder adjacent the body providing an air transfer passage, valve passages in the piston head and said cylinder head, the latter passage opening into the body chamber, normally-closed, spring-loaded valves in said passages for controlling the flow of air from the chamber of the body into the transfer chamber and from the transfer chamber into the compression and combustion chamber of the cylinder, the valves opening toward the outer end of the cylinder remote from the body, exhaust and intake valves at such outer end, means for operating the exhaust and intake valves, and means for supplying air under pressure to the chamber in the body.

5. In an internal combustion engine, a body formed with a chamber, a cylinder mounted on the body, a piston including a head working in the cylinder, and a part-cylindrical skirt portion extending through the body, a crank shaft located laterally at one side of the cylinder and extending in a direction crosswise of the axis of the cylinder, a connecting rod, means connecting the connecting rod to the skirt portion of the piston, a head at the inner end of the cylinder adjacent the body providing an air transfer passage, valve passages in the piston head and said cylinder head, the latter passage opening into the body chamber, normally-closed, spring-loaded valves in said passages for controlling the flow of air from the chamber of the body into the transfer chamber and from the transfer chamber into the compression and combustion chamber of the cylinder, the valves opening toward the outer end of the cylinder remote from the body, exhaust and intake valves at such outer end, means for operating the exhaust and intake valves, means for supplying air under pressure to the chamber in the body, and means for injecting fuel into the combustion chamber during the compression stroke of the piston.

6. In an internal combustion engine, a body formed with a chamber therein, cylinders mounted on opposite sides of the body in axial alinement, pistons including heads working in the cylinders respectively, and a part-cylindrical skirt portion connecting the piston heads and extending through the body, arcuate inserts at the inner ends of the cylinders adjacent the body having their internal faces of the same radius as that of the inner face of the skirt portion, the edges of the inserts engaging the edges of the skirt portion, stationary heads within the insert and coacting with the inner face thereof and with the inner face of the skirt portion, the piston heads and said cylinder heads having valve passages therethrough, normally-closed, spring-loaded valves in said passages and opening toward the ends of the cylinders remote from the body, means for supplying air under pressure to said chamber, exhaust and intake valves at the outer ends of the cylinders remote from the body, and operating mechanism therefor, fuel injectors located to inject fuel into the combustion chambers of the cylinders during the compression strokes of the pistons, a crank shaft located at one side of the cylinders and extending in a direction crosswise of the axis of the cylinders, and motion transmitting means between the crank shaft and the skirt portion including a connecting rod.

7. In an internal combustion engine, a body, cylinders arranged in axial alinement on opposite sides of the body, pistons including heads working in the cylinders respectively, and a part-cylindrical skirt portion connecting the heads, the body having a guide opening through which the skirt portion works, opposite outer ends of the cylinders constituting firing chambers, stationary heads at the inner ends of the cylinders adjacent the body and coacting with the skirt portion to hold compression, a skirt portion arcuate in cross-section connecting the last heads and nested in the skirt portion connecting the piston heads, a reciprocating cross-head slidable on the outer sides of the cylinders and extending across the body and connected to the skirt portion, a crank shaft, a connecting rod between the cross-head and the crank shaft, intake and exhaust valves operable to control the flow of air and fuel to the exhaust from the combustion chambers of the cylinders, the intake valves including normally-closed, spring-loaded valves in the piston heads openable by air pressure behind the piston heads on the suction stroke, and means for supplying and controlling the flow of air under pressure to the cylinder in the rear of the piston heads.

8. In an internal combustion engine, opposing cylinders arranged in axial alinement, pistons including heads working in the cylinders respectively, and a part-cylindrical skirt portion connecting the heads, the outer end of one cylinder constituting the combustion chamber, a cylinder head at the inner end of said cylinder, the piston head and the cylinder head having spring-loaded valves therein, an air inlet between the cylinder head with the valve therein and the other piston head, whereby the latter piston head acts to compress the air between it and said cylinder head, and means for supplying fuel to the combustion chamber, a crank shaft and a connecting rod between it and said other piston head.

9. In an internal combustion engine, opposing cylinders arranged in axial alinement, pistons including heads working in the cylinders respectively, and a part-cylindrical skirt portion connecting the heads, one cylinder and piston being an ignitable fuel compression and power cylinder and piston, and the other cylinder and piston being an air compression cylinder and piston, the outer end of the power cylinder constituting the combustion chamber, a cylinder head at the inner end of said power cylinder, a crank shaft, and a connecting rod between it and the air compressor piston, the space between the power piston head and the power cylinder head constituting an air transfer chamber, and the space between said cylinder head and the compressor piston consisting of an air compressor chamber, the air chamber having an air intake valve, valve-controlled passages between the air chamber and the transfer chamber and between the transfer chamber and the combustion chamber, an exhaust valve for the power cylinder, and means for supplying fuel to the air in the combustion chamber and igniting the same.

HUGH E. HOGAN.